United States Patent
Nakajima et al.

(10) Patent No.: US 10,041,496 B2
(45) Date of Patent: Aug. 7, 2018

(54) VENTILATION DEVICE

(71) Applicant: Panasonic Intellectual Property Management Co., Ltd., Osaka (JP)

(72) Inventors: Tsuraki Nakajima, Aichi (JP); Harumoto Itou, Aichi (JP); Masahiro Yamaguchi, Aichi (JP); Shingo Takenawa, Aichi (JP); Kazuki Doumoto, Aichi (JP); Teikyo Ueno, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 414 days.

(21) Appl. No.: 14/898,186

(22) PCT Filed: Jun. 26, 2014

(86) PCT No.: PCT/JP2014/003424
§ 371 (c)(1),
(2) Date: Dec. 14, 2015

(87) PCT Pub. No.: WO2014/208095
PCT Pub. Date: Dec. 31, 2014

(65) Prior Publication Data
US 2016/0131142 A1 May 12, 2016

(30) Foreign Application Priority Data

Jun. 28, 2013 (JP) .................................. 2013-135833
Jul. 30, 2013 (JP) .................................. 2013-157383
(Continued)

(51) Int. Cl.
*F04D 15/00* (2006.01)
*F04D 27/00* (2006.01)

(52) U.S. Cl.
CPC ..... *F04D 15/0066* (2013.01); *F04D 15/0094* (2013.01); *F04D 27/004* (2013.01)

(58) Field of Classification Search
CPC .................................................. F04D 15/0066
(Continued)

(56) References Cited

U.S. PATENT DOCUMENTS 8,602,747 B2 * 12/2013 Takada .................... F04D 27/00
388/804
2009/0230903 A1 9/2009 Yamamoto et al.
2013/0154536 A1 6/2013 Park

FOREIGN PATENT DOCUMENTS

EP   2385619 A2   11/2011
JP   61-107003 U   7/1986
(Continued)

OTHER PUBLICATIONS

International Search Report of PCT application No. PCT/JP2014/003424 dated Sep. 16, 2014.

*Primary Examiner* — David S Luo
(74) *Attorney, Agent, or Firm* — McDermott Will & Emery LLP

(57) ABSTRACT

Between the lower stage in respective phases of inverter circuit and the negative potential side, shunt resistors are inserted for respective phases. The potential differences across shunt resistors occurring by current flowing through shunt resistors are amplified by amplifier unit. From the output of amplifier unit, current detecting unit detects current of each phase flowing through motor formed by a sensorless brushless DC motor. Rotation detecting unit calculates the rotation speed and position of motor based on the current detected by current detecting unit. This structure makes it possible to directly detect solely the current flowing through the windings of motor. Therefore, it becomes possible to accurately detect the current of the motor windings, (Continued)

and the ventilation device can maintain the ventilation air volume from a small air volume to a large air volume always at a constant value.

7 Claims, 11 Drawing Sheets

(30)           Foreign Application Priority Data

Aug. 28, 2013   (JP) ................................ 2013-176454
Sep. 3, 2013   (JP) ................................ 2013-181865
Sep. 26, 2013   (JP) ................................ 2013-199538

(58) Field of Classification Search
    USPC ...................................................... 318/3, 34
    See application file for complete search history.

(56)              References Cited

FOREIGN PATENT DOCUMENTS

| | | |
|---|---|---|
| JP | 4-091696 A | 3/1992 |
| JP | 2002-101691 | 4/2002 |
| JP | 2002-165477 | 6/2002 |
| JP | 2005-214486 | 8/2005 |
| JP | 3738685 B2 | 1/2006 |
| JP | 2006-139208 | 6/2006 |
| JP | 2009-261080 | 11/2009 |
| JP | 2011-030423 A | 2/2011 |
| JP | 2011-239515 A | 11/2011 |
| JP | 2013-126371 A | 6/2013 |
| WO | 2008/001572 A1 | 1/2008 |
| WO | 2012/025904 | 3/2012 |

* cited by examiner

VENTILATION DEVICE

TECHNICAL FIELD

The present invention relates to a method for controlling the air volume of a ventilation device such as a fan motor that exerts inverter control, such as an air conditioning apparatus.

BACKGROUND ART

A control circuit of a conventional air blower apparatus that can be used as a ventilation device has the following structure. Firstly, AC power from AC power supply is converted from alternating current to direct current by an AC-DC converter circuit, and smoothed by a capacitor. DC voltage is generated across the capacitor, and input to an inverter via a current detector. Six semiconductors structuring the inverter are mutually operated (switched), to thereby drive a motor. Since the current flowing through the motor flows via the inverter and the current detector, the current is detected by voltage induced across the current detector.

Further, a position sensor is mounted so as to generate a signal corresponding to the position of a rotor based on the rotation of the motor. By the signal from the position sensor, a rotation speed detecting unit detects the rotation speed of the motor. The detected rotation speed is output to an air volume calculation unit and a speed control unit. Further, the air volume calculation unit calculates an air volume generated by a fan connected to the motor based on the current value of the motor detected by the current detecting unit and the rotation speed of the motor detected by the rotation speed detecting unit.

The air volume calculation unit calculates the air volume based on the rotation speed detected by the rotation speed detecting unit and the current detected by the current detecting unit. A target rotation speed calculation unit derives a deviation of the calculated air volume from a target air volume, and calculates a target rotation speed being the target of the motor's operation such that the deviation becomes 0. The speed control unit controls the speed of the motor such that the target rotation speed calculated by the air volume calculation unit is attained. Accordingly, the air volume generated by the fan connected to the motor and the target air volume agree with each other. Thus, the structure for controlling the air volume at a constant value is obtained (for example, see PTL 1).

Further, when an instantaneous power failure occurs, the DC voltage smoothed by the capacitor, i.e., the voltage for driving the motor largely varies. This makes it impossible to control the air volume at a constant value. Accordingly, when the DC voltage drops by an instantaneous power failure, the motor is stopped by immediately stopping the voltage application and discharge of the capacitor is relaxed, to thereby extend the instantaneous power failure supporting time (for example, see PTL 2).

CITATION LIST

Patent Literatures

PTL 1: Unexamined Japanese Patent Publication No. 2002-165477

PTL 2: Unexamined Japanese Utility Model Publication No. S61-107003

SUMMARY OF THE INVENTION

With such a conventional air blower apparatus, the air volume is calculated using the current and the rotation speed. The current detecting unit is connected between a portion where the negative potential side terminals of the switching elements structuring the lower stage of the inverter circuit are gathered at one point and the circuit ground.

Such an air blower apparatus has the following problems. While the current of the motor is measured by the current detecting unit, since the current detecting unit is connected to the ground of the circuit, the motor current can only be detected as the three-phase composite current. Further, when the switching elements are structured including a driver, the current required by the driver is detected, and the accurate phase current of the motor cannot be detected.

Further, when the air blower apparatus is driven in a large air volume mode, the current flowing through the circuit is great (for example, 1.2 A). On the other hand, the current required by the driver is about 10 mA, i.e., being small in the proportion, and therefore the air volume is not influenced. However, when the air blower apparatus is driven in a small air volume mode, the current flowing through the circuit is small (about 30 mA), and the proportion of the current required by the driver (10 mA) becomes great. Accordingly, the detected current includes a great error to the current value corresponding to the actual air volume. Thus, the air volume cannot be accurately controlled.

Accordingly, the present invention provides a ventilation device that accurately detects current flowing through the motor and accurately exerts air volume control to achieve a target air volume.

Further, as described above, with the conventional air blower apparatus which can be used as a ventilation device which calculates the air volume by measuring the current of the motor by the current detecting unit, the position of the motor is calculated based on the output of the current detecting unit. Accordingly, when DC voltage for driving the motor drops by an instantaneous power failure or the like, control of the motor is immediately stopped and driving of the motor is stopped. However, when control over the motor is once stopped, the motor must be completely stopped in order to again drive, which makes a user feel uncomfortable for the time taken to restart.

Accordingly, the present invention provides a ventilation device which adjusts the rotation speed of the motor upon an occurrence of an instantaneous power failure, thereby preventing the user from feeling uncomfortable upon such an occurrence of an instantaneous power failure.

The ventilation device of the present invention is a ventilation device capable of varying an air volume, and includes therein a motor driving a vane, and a control circuit controlling the motor. The control circuit includes therein an inverter circuit obtained by connecting, in a three-phase bridge manner, three arms formed by coupling, in series with DC voltage, two switching elements of an upper stage and a lower stage performing mutually opposite ON/OFF operations, to apply AC voltage of a three-phase PWM (Pulse Width Modulation) scheme to the motor. The control circuit further includes therein shunt resistors inserted for respective phases between the lower stage in respective phases of the inverter circuit and the negative potential side, and an amplifier unit configured to amplify voltage between terminals of the shunt resistors. The control circuit further includes a current detecting unit configured to detect current of each phase flowing through the motor from the output of the amplifier unit, and a rotation detecting unit configured to calculate a rotation speed and a position of the motor based on the current detected by the current detecting unit. The control circuit further includes an air volume calculation unit configured to receive a current value of one phase out of current values of respective phases detected by the current detecting unit and the rotation speed calculated by the rotation detecting unit, and configured to compare the received current value and the received rotation speed with a current value and a rotation speed corresponding to a target air volume. The control circuit further includes a speed control unit configured to control the rotation speed of the motor by varying duty for the inverter circuit, based on a comparison result of the air volume calculation unit.

This structure makes it possible to directly detect solely the current flowing through the windings of the motor. Therefore, it becomes possible to accurately detect the current of the motor windings. Thus, the effect of maintaining the ventilation air volume always at a constant value and suppressing wasteful energy can be achieved.

DESCRIPTION OF EMBODIMENTS

In the following, a description will be given of exemplary embodiments of the present invention with reference to the drawings.

First Exemplary Embodiment

A description will be given of a ventilation device according to a first exemplary embodiment of the present invention as being installed on the ceiling of a building.

With the ventilation device according to the present exemplary embodiment, by exploiting the characteristic of a DC motor, control is exerted from low rotation speeds to high rotation speeds, and a single ventilation device caters from a small air volume to a large air volume.

Figure 1:
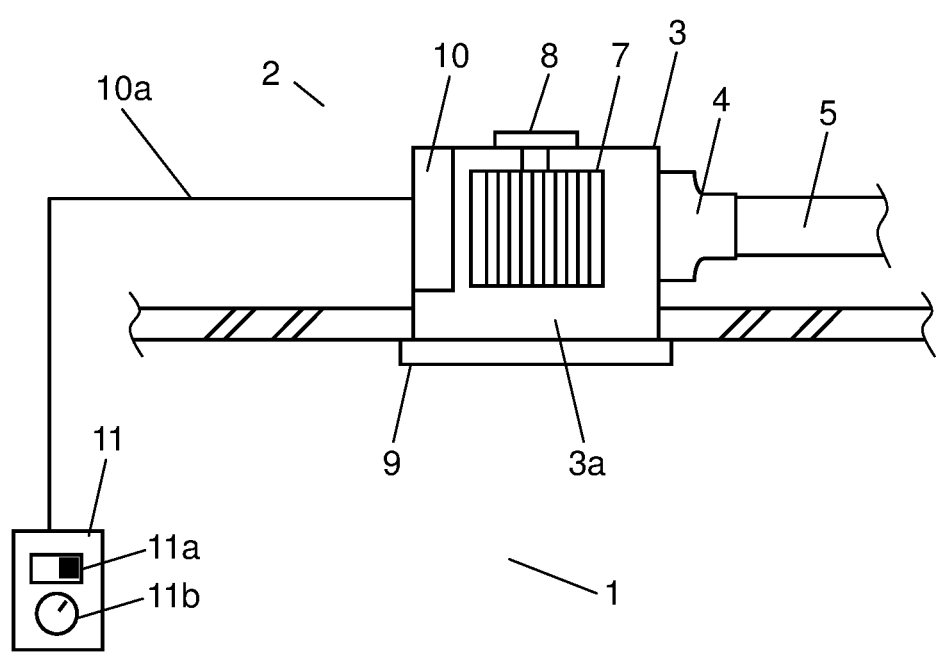
FIG. 1 is an installation diagram showing the state where a ventilation device according to a first exemplary embodiment of the present invention is installed on the ceiling.

As shown in FIG. 1, the ventilation device according to the present exemplary embodiment is installed in attic 2 of room 1, and has intake port 3a at a lower portion of body 3. Adaptor 4 is provided at the side surface of body 3. Through exhaust duct 5 connected to adaptor 4, body 3 is connected to an exhaust port (not shown) provided to an exterior wall or the like. Inside body 3, motor 8 made up of vane 7 and a sensorless brushless DC motor for rotating vane 7 is provided. Intake port 3a is provided with louver 9 covering intake port 3a. Louver 9 has an air-communication port through which the air of the room passes. Further, control circuit 10 driving motor 8 is disposed inside body 3 of the ventilation device. Then, remote controller apparatus 11 having power ON/OFF switch 11a and fan notch setting switch 11b is disposed on the wall of the room, and connected to control circuit 10 by signal line 10a.

Figure 2:
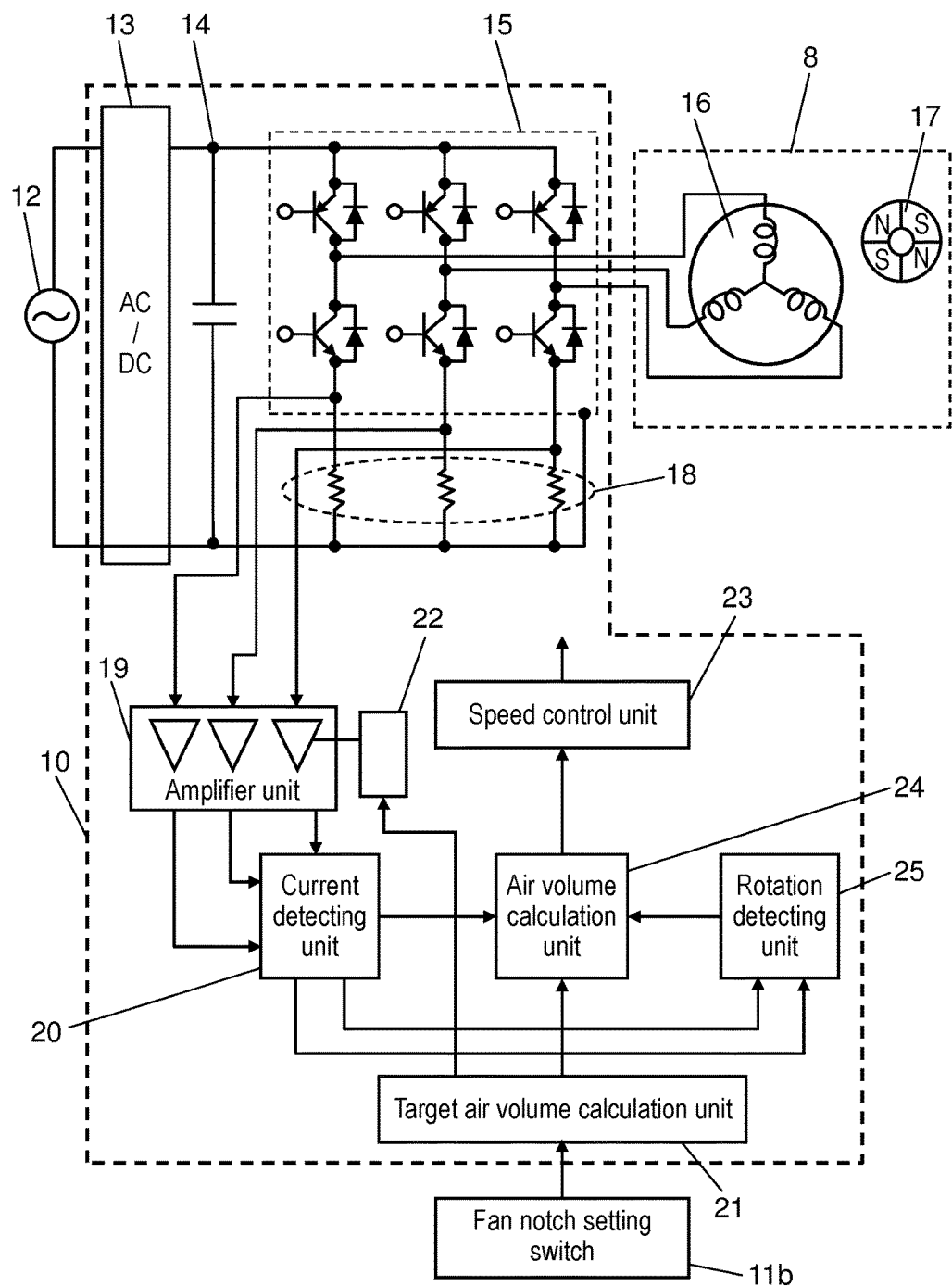
FIG. 2 is a block diagram showing the structure of a control circuit of the ventilation device according to the first exemplary embodiment of the present invention.

FIG. 2 is a block diagram showing the structure of control circuit 10 of the ventilation device according to the present exemplary embodiment. In FIG. 2, AC voltage supplied from commercial power supply 12 is converted into DC voltage by AC-DC converter circuit 13. Thereafter, the DC voltage is smoothed by smoothing capacitor 14, and the smoothed DC voltage is applied to inverter circuit 15. Inverter circuit 15 brings six switching elements into conduction in order, to thereby drive motor 8 formed by a sensorless brushless DC motor. Motor 8 is made up of stator 16 around which windings are wrapped and rotor 17 provided with a magnet.

Further, between the lower stage in respective phases of inverter circuit 15 and the negative potential side, shunt resistors 18 are inserted for respective phases. The potential differences across shunt resistors 18 that occur by current flowing through shunt resistors 18 are amplified by amplifier unit 19. From the output of amplifier unit 19, current detecting unit 20 detects current of each phase flowing through motor 8. Rotation detecting unit 25 calculates the rotation speed and position of motor 8 based on the current detected by current detecting unit 20.

Air volume calculation unit 24 compares the current value of one phase out of the current values of respective phases detected by current detecting unit 20 and the rotation speed calculated by rotation detecting unit 25 with a current value and a rotation speed corresponding to target air volume Qs. Then, air volume calculation unit 24 determines whether the blown air volume is higher or lower than target air volume Qs based on the comparison result.

Target air volume calculation unit 21 calculates target air volume Qs in accordance with the setting of fan notch setting switch 11b, and instructs air volume calculation unit 24 about target air volume Qs.

Amplification factor changing unit 22 receives target air volume Qs calculated by target air volume calculation unit 21, and changes the amplification factor amplifier unit 19 of a predetermined phase in accordance with the magnitude of target air volume Qs.

Speed control unit 23 outputs duty to inverter circuit 15, and varies the rotation speed of motor 8 formed by a sensorless brushless DC motor.

Then, motor 8 outputs the necessary air volume by varying the rotation speed.

Figure 3:
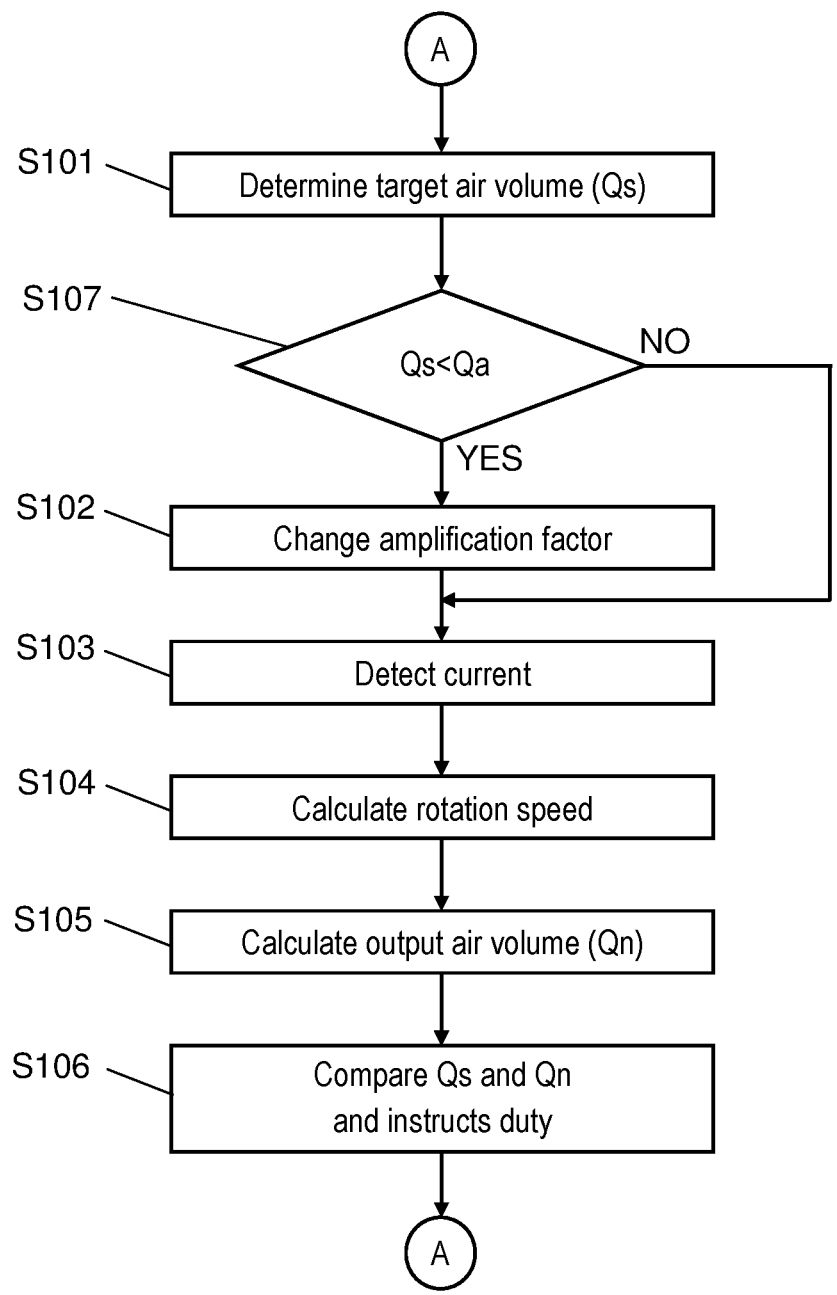
FIG. 3 is a flowchart showing the driving operation of the ventilation device according to the first exemplary embodiment of the present invention.

In the following, with reference to FIG. 3, a description will be given of the operation of the ventilation device according to the present exemplary embodiment.

The user manipulates remote controller apparatus 11 to turn ON body 3 of the ventilation device so as to drive the ventilation device. Further, the user sets fan notch setting switch 11b to, for example, weak notch. Then, voltage is applied to control circuit 10, and target air volume calculation unit 21 determines target air volume Qs corresponding to the weak notch according to the setting "weak notch" of fan notch setting switch 11b, and instructs air volume calculation unit 24 about the determined target air volume Qs (Step S101). Target air volume Qs may be determined by referring to a table stored in memory, or may be based on a preset calculation formula. When target air volume Qs is determined, amplification factor changing unit 22 changes the amplification factor of one of the three phases, in accordance with target air volume Qs (Step S102). Speed control unit 23 outputs duty to inverter circuit 15 based on the value determined by target air volume Qs.

When inverter circuit 15 receives the duty, inverter circuit 15 brings six switching elements into conduction in order, to thereby drive motor 8 formed by a sensorless brushless DC motor. When motor 8 is driven, current flows through shunt resistors 18. Amplifier unit 19 amplifies the potential differences across shunt resistors 18. Current detecting unit 20 detects the amplified potential differences across shunt resistors 18, and based on the potential differences, current detecting unit 20 detects, for each phase, winding current flowing through the windings of motor 8 (Step S103). Out of the detected winding current of respective phases, the current of two phases is input to rotation detecting unit 25. While a detailed description will be given later, the winding current of the remaining one phase is input to air volume calculation unit 24. Rotation detecting unit 25 calculates the rotation speed and position of motor 8 from the winding current of the two phases (Step S104).

Next, air volume calculation unit 24 calculates present output air volume Qn, based on the current value of the one phase detected by current detecting unit 20 and the rotation speed detected by rotation detecting unit 25 (Step S105). Then, air volume calculation unit 24 compares the calculated output air volume Qn with target air volume Qs. When output air volume Qn is smaller than target air volume Qs, air volume calculation unit 24 instructs speed control unit 23 to output great duty. When output air volume Qn is greater than target air volume Qs, air volume calculation unit 24 instructs speed control unit 23 to output small duty. Thus, control is exerted such that deviation of output air volume Qn from target air volume Qs becomes small (Step S106).

Here, when output air volume Qn is sufficiently small relative to the rated air volume, the current flowing through shunt resistors 18 is small, and it is difficult for current detecting unit 20 to accurately detect the current flowing through the windings. Accordingly, when target air volume Qs is smaller than predetermined air volume Qa, amplification factor changing unit 22 performs a process of increasing the amplification factor of amplifier unit 19 for detecting the current value input to air volume calculation unit 24 (Step S107, Step S102). Predetermined air volume Qa is a previously stored air volume value. This Qa is set to a value sufficiently small relative to the rated air volume, and with which accurate winding current cannot be detected by current detecting unit 20 unless the amplification factor is switched.

With the ventilation device structured as described above, since shunt resistors 18 are inserted between the lower stage in respective phases of inverter circuit 15 and the negative potential side and current flowing through motor 8 is detected by detecting current flowing through shunt resistors 18, the winding current can be accurately detected. Further, by changing the amplification factor of one of the phases by amplification factor changing unit 22, the winding current can be accurately detected. Accordingly, ventilation from a small air volume to a large air volume exploiting the characteristic of the DC motor can be realized by a single body.

Further, in the present exemplary embodiment, though amplification factor changing unit 22 switches the amplification factor in accordance with target air volume Qs, it is also possible that amplification factor changing unit 22 switches the amplification factor based on the current value detected by current detecting unit 20.

Still further, in the present exemplary embodiment, motor 8 formed by a sensorless brushless DC motor is employed. However, amplification factor changing unit 22 switching the amplification factor can be also applied to a brushless DC motor that detects the relative position of rotor 17 to stator 16 using the output of a magnetic sensor. That is, the same effect can be achieved in the structure in which shunt resistor 18 is connected to one of the phases, and amplification factor changing unit 22 switches the amplification factor of amplifier unit 19 amplifying the potential difference across shunt resistor 18.

Second Exemplary Embodiment

In the following, a description will be given of a ventilation device according to a second exemplary embodiment of the present invention.

With the ventilation device according to the present exemplary embodiment, by exploiting the characteristic of a DC motor, control is exerted from low rotation speeds to high rotation speeds, and a single ventilation device caters from a small air volume to a large air volume.

Note that, since the overall structure of the ventilation device according to the present exemplary embodiment is similar to that of the ventilation device according to the first exemplary embodiment of the present invention, constituent elements are denoted by identical reference characters and a description thereof will be omitted.

Figure 4:
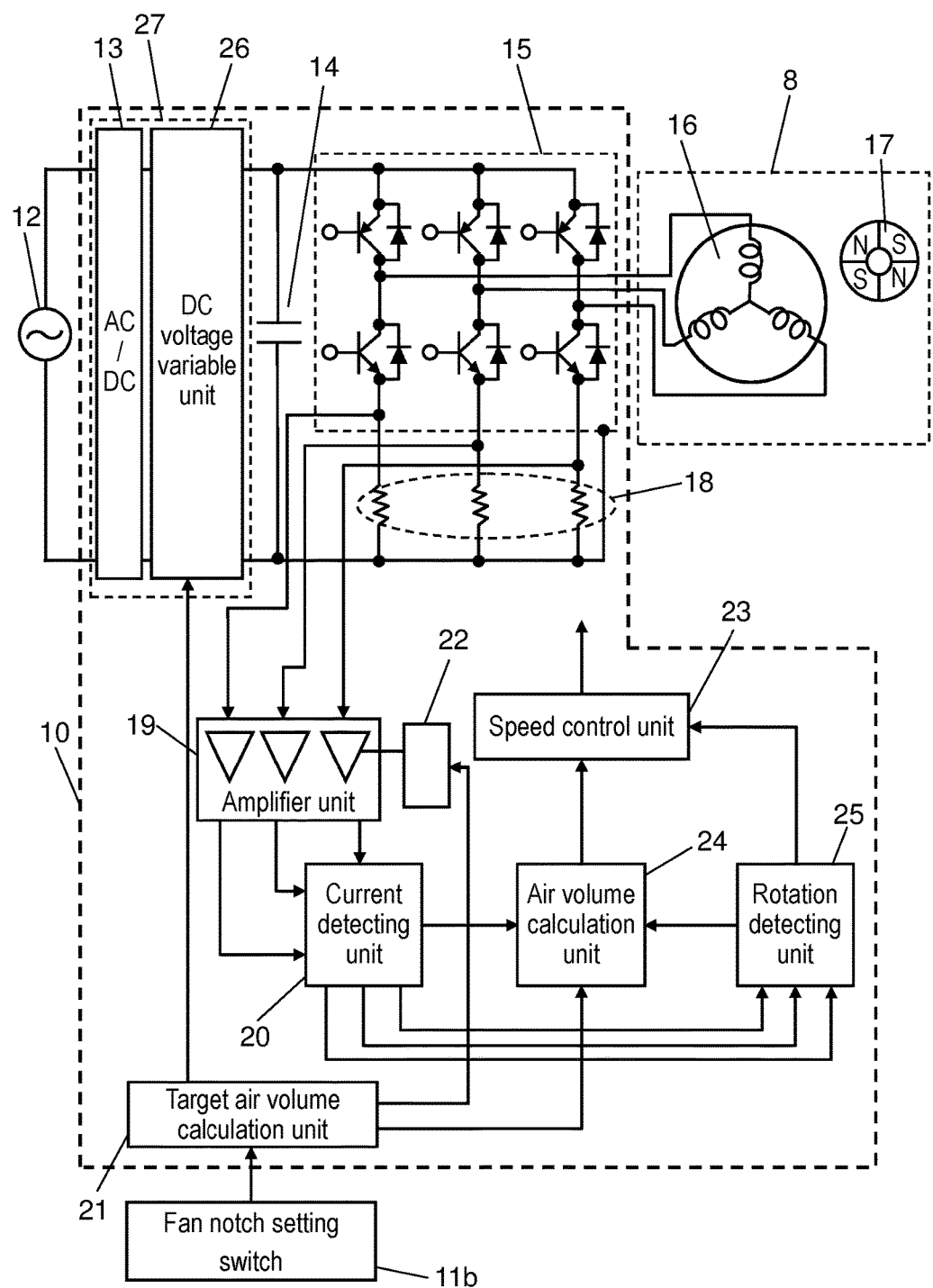
FIG. 4 is a block diagram showing the structure of a control circuit of a ventilation device according to a second exemplary embodiment of the present invention.

FIG. 4 is a block diagram showing the structure of control circuit 10 of the ventilation device according to the second exemplary embodiment of the present invention. In FIG. 4, AC voltage supplied from commercial power supply 12 is converted into DC voltage by AC-DC converter circuit 13. Thereafter, DC voltage variable unit 26 generates desired DC voltage according to a method which will be described later. The generated DC voltage is smoothed by smoothing capacitor 14, and the smoothed DC voltage is applied to inverter circuit 15. Inverter circuit 15 brings six switching elements into conduction in order, to thereby drive motor 8 formed of a sensorless brushless DC motor. Motor 8 is made up of stator 16 around which windings are wrapped and rotor 17 provided with a magnet.

Note that, AC-DC converter circuit 13 structures power supply circuit 27 with DC voltage variable unit 26.

Further, between the lower stage in respective phases of inverter circuit 15 and the negative potential side, shunt resistors 18 are inserted for respective phases. The potential differences across shunt resistors 18 that occur by current flowing through shunt resistors 18 are amplified by amplifier unit 19. From the output of amplifier unit 19, current detecting unit 20 detects current of each phase flowing through motor 8. Rotation detecting unit 25 calculates the rotation speed and position of motor 8 based on the current detected by current detecting unit 20.

Air volume calculation unit 24 compares the current value of one phase out of the current values of respective phases detected by current detecting unit 20 and the rotation speed detected by rotation detecting unit 25 with a current value and a rotation speed corresponding to target air volume Qs. Then, air volume calculation unit 24 determines whether the blown air volume is higher or lower than target air volume Qs based on the comparison result.

Target air volume calculation unit 21 calculates target air volume Qs in accordance with the setting of fan notch setting switch 11*b*. Then, target air volume calculation unit 21 informs air volume calculation unit 24 of target air volume Qs, and informs DC voltage variable unit 26 and amplification factor changing unit 22 of target air volume Qs. DC voltage variable unit 26 changes the output DC voltage in accordance with target air volume Qs.

Amplification factor changing unit 22 receives target air volume Qs determined by target air volume calculation unit 21, and changes the amplification factor of amplifier unit 19 of a predetermined phase in accordance with the magnitude of target air volume Qs.

While details will be given later, speed control unit 23 outputs duty to inverter circuit 15 based on a comparison result between present output air volume Qn and target air volume Qs output from air volume calculation unit 24, to thereby control the rotation speed of motor 8.

In this manner, motor 8 outputs the necessary air volume by varying the rotation speed.

Figure 5:
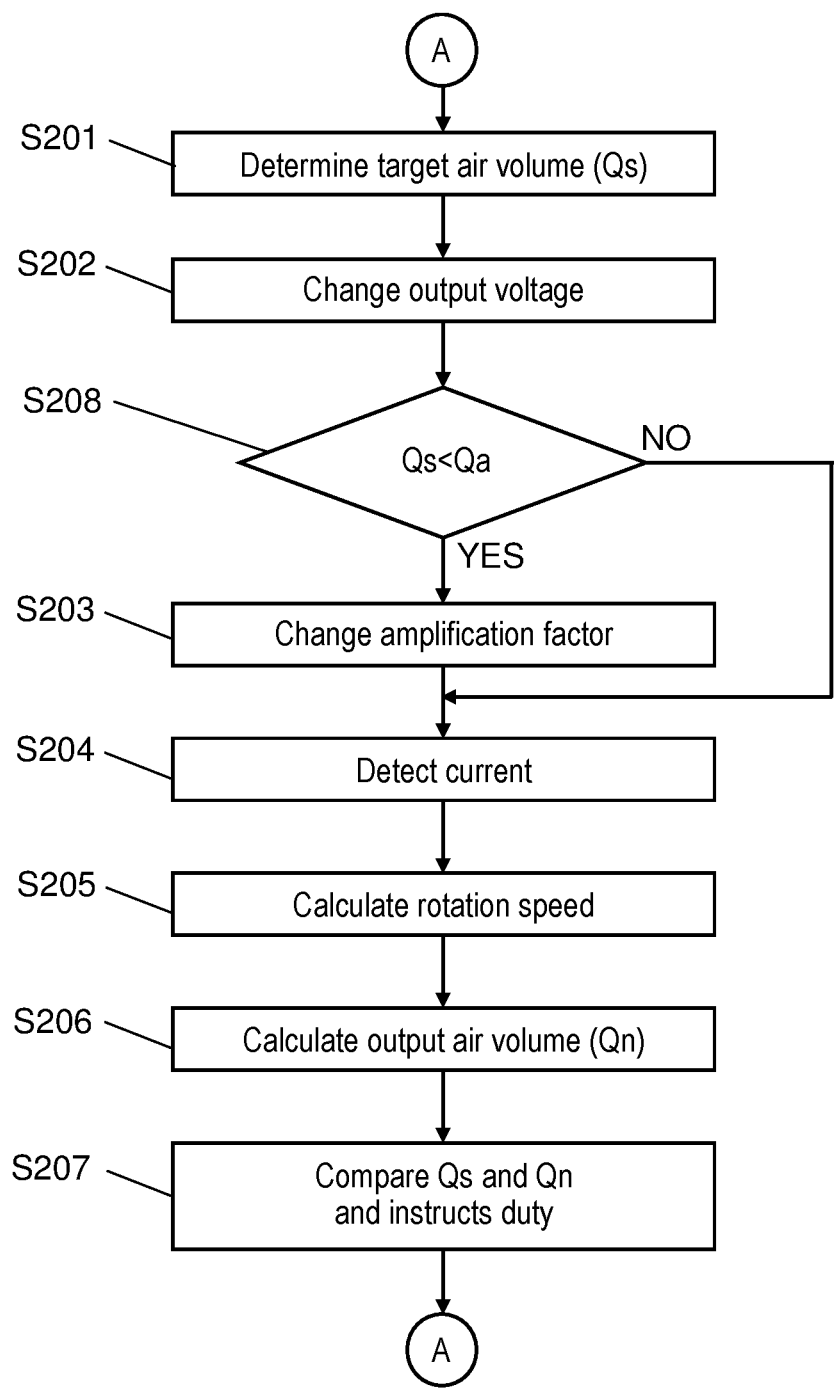
FIG. 5 is a flowchart showing the driving operation of the ventilation device according to the second exemplary embodiment of the present invention.

In the following, with reference to FIG. 5, a description will be given of the operation of the ventilation device according to the present exemplary embodiment.

The user manipulates remote controller apparatus 11 to turn ON body 3 of the ventilation device so as to drive the ventilation device. Further, the user sets fan notch setting switch 11*b* to, for example, weak notch. Then, voltage is applied to control circuit 10, and target air volume calculation unit 21 determines target air volume Qs corresponding to the weak notch according to the setting "weak notch" of fan notch setting switch 11*b*, and instructs air volume calculation unit 24 about the determined target air volume Qs (Step S201). Target air volume Qs may be determined by referring to a table stored in memory, or may be based on a preset calculation formula. Air volume calculation unit 24, DC voltage variable unit 26, and amplification factor changing unit 22 are informed of target air volume Qs.

DC voltage variable unit 26 changes the output DC voltage in accordance with the received target air volume Qs (Step S202).

Here, the voltage output by DC voltage variable unit 26 is set to be an output voltage that can satisfy a predetermined target air volume with the maximum duty which is output when weak notch is set (for example, 95%). Thus, current flowing through the windings of motor 8 increases, whereby the current value recognized by air volume calculation unit 24 increases.

When target air volume Qs is determined, amplification factor changing unit 22 changes the amplification factor of one of the three phases in accordance with target air volume Qs (Step S203). Speed control unit 23 outputs duty to inverter circuit 15 based on the comparison result between the present output air volume and target air volume Qs output by air volume calculation unit 24.

When inverter circuit 15 receives the duty, inverter circuit 15 brings six switching elements into conduction in order, to thereby drive motor 8 formed of a sensorless brushless DC motor. When motor 8 is driven, current flows through shunt resistors 18. Amplifier unit 19 amplifies the potential differences across shunt resistors 18. Current detecting unit 20 detects the amplified potential differences across shunt resistors 18, and based on the potential differences, current detecting unit 20 detects, for each phase, winding current flowing through the windings of motor 8 (Step S204). Out of the detected winding current of respective phases, the current of two phases is input to rotation detecting unit 25. While a detailed description will be given later, the winding current of the remaining one phase is input to air volume calculation unit 24. Rotation detecting unit 25 calculates the rotation speed and position of motor 8 from the winding current of the two phases (Step S205).

Next, air volume calculation unit 24 calculates present output air volume Qn, based on the current value of the one phase detected by current detecting unit 20 and the rotation speed detected by rotation detecting unit 25 (Step S206). Then, air volume calculation unit 24 compares the calculated output air volume Qn with target air volume Qs. When output air volume Qn is smaller than target air volume Qs, air volume calculation unit 24 instructs speed control unit 23 to output great duty. When output air volume Qn is greater than target air volume Qs, air volume calculation unit 24 instructs speed control unit 23 to output small duty. Thus, control is exerted such that deviation of output air volume Qn from target air volume Qs becomes small (Step S207).

Here, when output air volume Qn is sufficiently small relative to the rated air volume, the current flowing through shunt resistors 18 is small, and it is difficult for current detecting unit 20 to accurately detect the current flowing through the windings. Accordingly, when target air volume Qs is smaller than predetermined air volume Qa, amplification factor changing unit 22 performs a process of increasing the amplification factor of amplifier unit 19 for detecting the current value input to air volume calculation unit 24 (Step S208, Step S203). Predetermined air volume Qa is a previously stored air volume value. This Qa is set to a value sufficiently small relative to the rated air volume, and with which accurate winding current cannot be detected by current detecting unit 20 unless the amplification factor is switched.

With the ventilation device structured as described above, since shunt resistors 18 are inserted between the lower stage in respective phases of inverter circuit 15 and the negative potential side and current flowing through motor 8 is detected by detecting current flowing through shunt resistors 18, the winding current can be accurately detected.

Further, in accordance with target air volume Qs, the DC voltage output by DC voltage variable unit 26 is varied. In particular, in the case of a small air volume, small DC voltage is output, thereby increasing the current flowing through the windings of motor 8. In this manner, by increasing the current value recognized by air volume calculation unit 24, and reducing the recognition error, the current of the motor windings can be accurately detected. Thus, the ventilation air volume can be maintained always at a constant value.

Still further, by changing the amplification factor of one of the phases by amplification factor changing unit 22, the winding current can be accurately detected. Accordingly, ventilation from a small air volume to a large air volume exploiting the characteristic of the DC motor can be realized by a single body.

Still further, in the present exemplary embodiment, though amplification factor changing unit 22 switches the amplification factor in accordance with target air volume Qs, it is also possible that amplification factor changing unit 22 switches the amplification factor based on the current value detected by current detecting unit 20.

Still further, in the present exemplary embodiment, motor 8 formed of a sensorless brushless DC motor is employed. However, amplification factor changing unit 22 switching the amplification factor can be also applied to a brushless DC motor that detects the relative position of rotor 17 to stator 16 using the output of a magnetic sensor. That is, the same effect can be achieved in the structure in which shunt resistor 18 is connected to one of the phases, and amplification factor changing unit 22 switches the amplification factor of amplifier unit 19 amplifying the potential difference across shunt resistor 18.

Still further, though input of target air volume calculation unit 21 is the notch set with remote controller apparatus 11, it is also possible that a switch is provided in the body, and the notch set by the switch is employed as input.

Third Exemplary Embodiment

In the following, a description will be given of a ventilation device according to a third exemplary embodiment of the present invention.

With the ventilation device according to the present exemplary embodiment, by exploiting the characteristic of a DC motor, control is exerted from low rotation speeds to high rotation speeds, and a single ventilation device caters from a small air volume to a large air volume.

Note that, since the overall structure of the ventilation device according to the present exemplary embodiment is similar to that of the ventilation device according to the first exemplary embodiment of the present invention, constituent elements are denoted by identical reference characters and a description thereof will be omitted.

Figure 6:
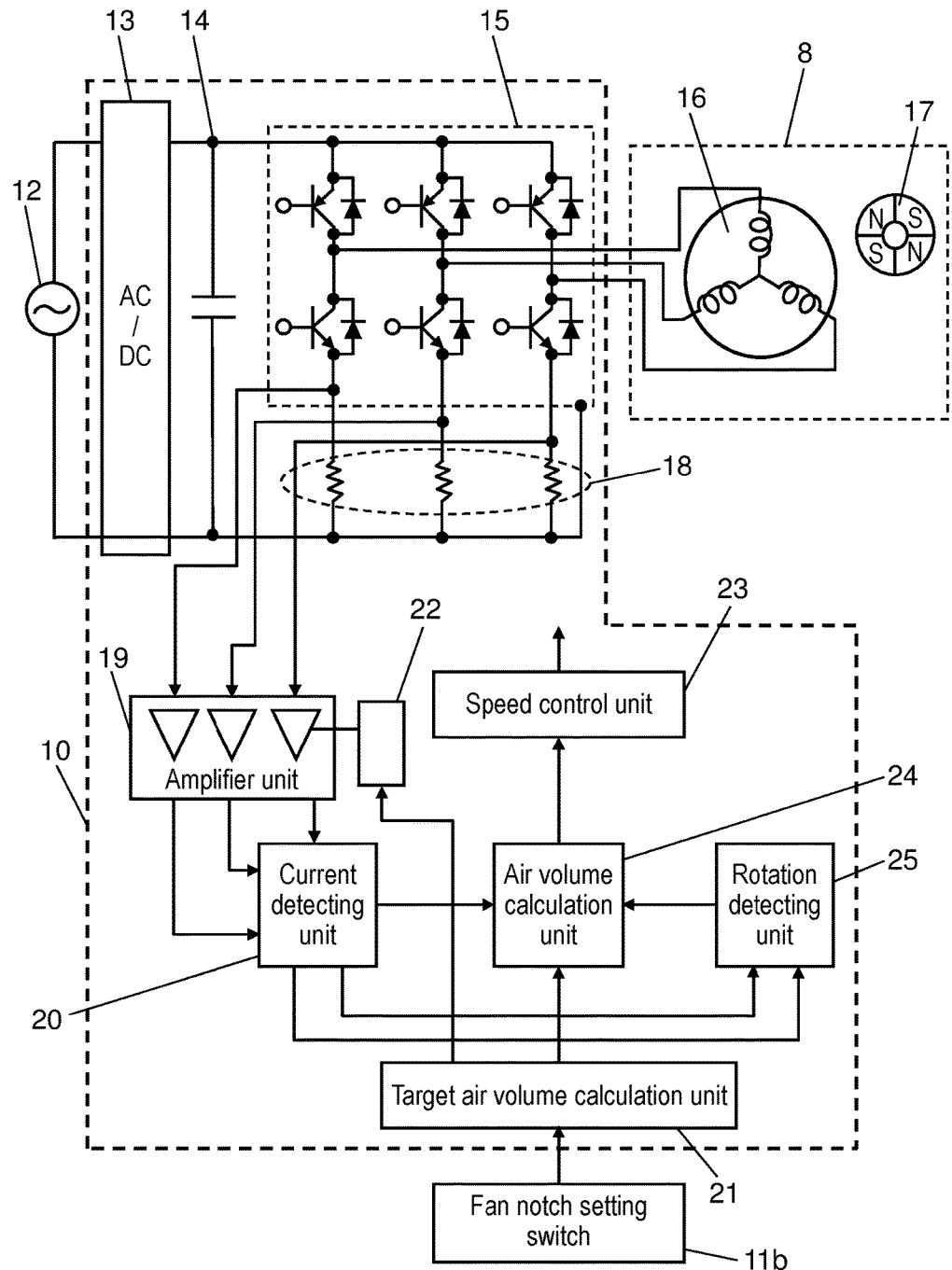
FIG. 6 is a block diagram showing the structure of a control circuit of a ventilation device according to a third exemplary embodiment of the present invention.

FIG. 6 is a block diagram showing the structure of control circuit 10 of ventilation device according to the third exemplary embodiment of the present invention. In FIG. 6, AC voltage supplied from commercial power supply 12 is converted into DC voltage by AC-DC converter circuit 13. Thereafter, the DC voltage is smoothed by smoothing capacitor 14, and the smoothed DC voltage is applied to inverter circuit 15. Inverter circuit 15 brings six switching elements into conduction in order, to thereby drive motor 8 formed of a sensorless brushless DC motor. Motor 8 is made up of stator 16 around which windings are wrapped and rotor 17 provided with a magnet.

Further, between the lower stage in respective phases of inverter circuit 15 and the negative potential side, shunt resistors 18 are inserted for respective phases. The potential differences across shunt resistors 18 that occur by current flowing through shunt resistors 18 are amplified by amplifier unit 19. From the output of amplifier unit 19, current detecting unit 20 detects current of each phase flowing through motor 8. Rotation detecting unit 25 calculates the rotation speed and position of motor 8 based on the current detected by current detecting unit 20.

Air volume calculation unit 24 compares the current value of one phase out of the current values of respective phases detected by current detecting unit 20 and the rotation speed calculated by rotation detecting unit 25 with a current value and a rotation speed corresponding to target air volume Qs. Then, air volume calculation unit 24 determines whether the blown air volume is higher or lower than target air volume Qs based on the comparison result.

Target air volume calculation unit 21 calculates target air volume Qs in accordance with the setting of fan notch setting switch 11b, and instructs air volume calculation unit 24 about target air volume Qs.

Amplification factor changing unit 22 receives target air volume Qs calculated by target air volume calculation unit 21, and changes the amplification factor of amplifier unit 19 of a predetermined phase in accordance with the magnitude of target air volume Qs.

Speed control unit 23 outputs duty to inverter circuit 15, and varies the rotation speed of motor 8 formed of a sensorless brushless DC motor.

Then, motor 8 outputs the necessary air volume by varying the rotation speed.

Figure 7:
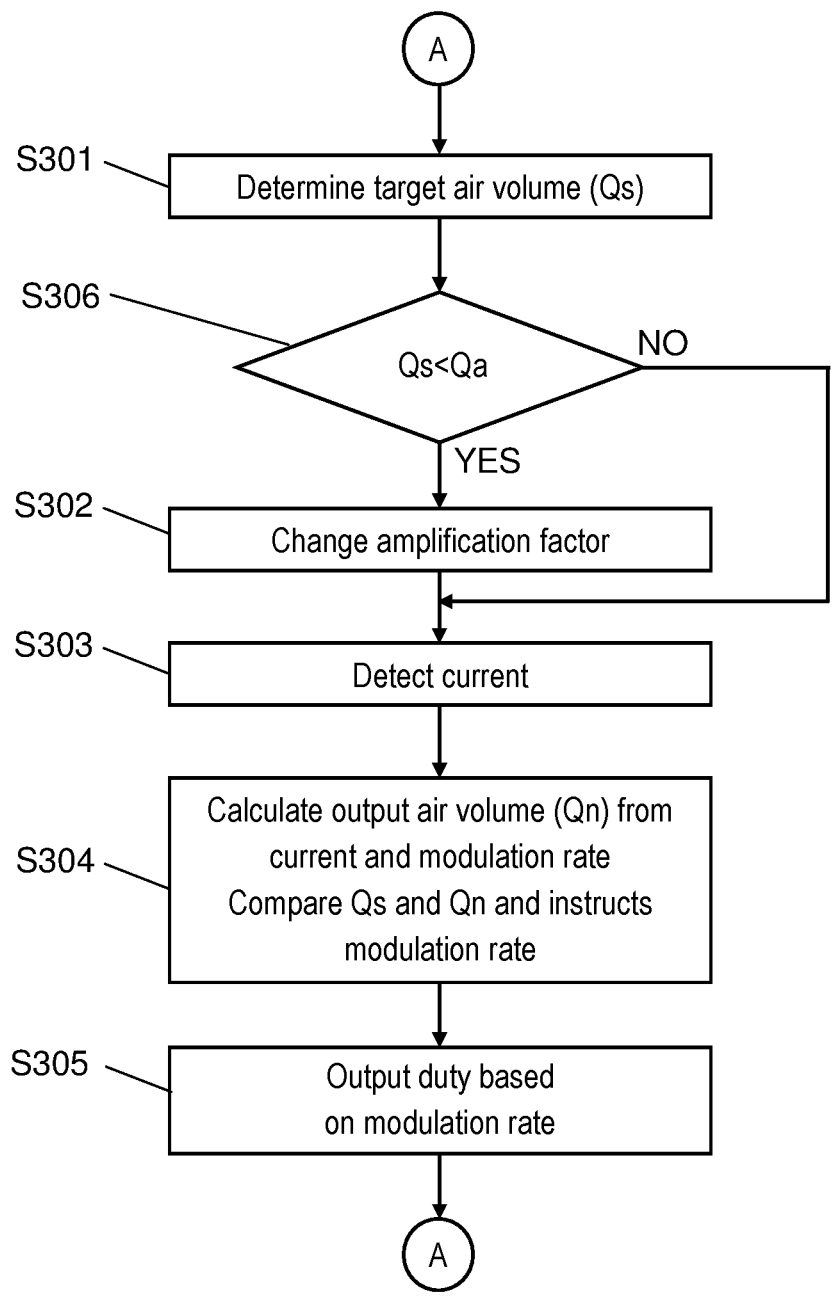
FIG. 7 is a flowchart showing the driving operation of the ventilation device according to the third exemplary embodiment of the present invention.

In the following, with reference to FIG. 7, a description will be given of the operation of the ventilation device according to the present exemplary embodiment.

The user manipulates remote controller apparatus 11 to turn ON body 3 of the ventilation device so as to drive the ventilation device. Further, the user sets fan notch setting switch 11b to, for example, weak notch. Then, voltage is applied to control circuit 10, and target air volume calculation unit 21 determines target air volume Qs corresponding to the weak notch according to the setting "weak notch" of fan notch setting switch 11b, and instructs air volume calculation unit 24 about the determined target air volume Qs (Step S301). Target air volume Qs may be determined by referring to a table stored in memory, or may be based on a preset calculation formula. When target air volume Qs is determined, amplification factor changing unit 22 changes the amplification factor of one of the three phases, in accordance with target air volume Qs (Step S302). Speed control unit 23 outputs duty to inverter circuit 15 based on the modulation rate determined by air volume calculation unit 24.

When inverter circuit 15 receives the duty, inverter circuit 15 brings six switching elements into conduction in order, to thereby drive motor 8 formed of a sensorless brushless DC motor. When motor 8 is driven, current flows through shunt resistors 18. Amplifier unit 19 amplifies the potential differences across shunt resistors 18. Current detecting unit 20 detects the amplified potential differences across shunt resistors 18, and based on the potential differences, current detecting unit 20 detects, for each phase, winding current flowing through the windings of motor 8 (Step S303). Out of the detected winding current of respective phases, the current of two phases is input to rotation detecting unit 25. While a detailed description will be given later, the winding current of the remaining one phase is input to air volume calculation unit 24. Rotation detecting unit 25 calculates the rotation speed and position of motor 8 from the winding current of the two phases.

Next, air volume calculation unit 24 calculates present output air volume Qn, based on the current value of the one phase detected by current detecting unit 20 and the modulation rate of voltage applied to the motor. Specifically, for example, the relationship between the modulation rate of voltage applied to the motor and the motor current with target air volume Qs is previously stored, and present output air volume Qn is reversely calculated based on this relationship. That is, for the modulation rate of voltage applied to the motor, the motor current when target air volume Qs is attained (defined motor current) is obtained. The obtained defined motor current value is compared with the current value of the one phase detected by the current detecting unit. When the defined motor current value is smaller, it is determined that output air volume Qn is great (excessively great) relative to target air volume Qs. On the other hand, when the defined motor current value is greater, it is determined that output air volume Qn is small (insufficient) relative to target air volume Qs. Further, when the defined motor current value and the current value of the one phase detected by the current detecting unit are equal to each other, output air volume Qn is calculated to be equal to target air volume Qs.

Then, when output air volume Qn is smaller than target air volume Qs, air volume calculation unit 24 instructs speed control unit 23 to output great modulation rate. When output air volume Qn is greater than target air volume Qs, air volume calculation unit 24 instructs speed control unit 23 to output small modulation rate (Step S304). Then, based on the modulation rate instructed by air volume calculation unit 24, speed control unit 23 outputs duty, and thus control is exerted such that deviation of output air volume Qn from target air volume Qs becomes small (Step S305).

Here, when output air volume Qn is sufficiently small relative to the rated air volume, the current flowing through shunt resistors 18 is small, and it is difficult for current detecting unit 20 to accurately detect the current flowing through the windings. Accordingly, when target air volume Qs is smaller than predetermined air volume Qa, amplification factor changing unit 22 performs a process of increasing the amplification factor of amplifier unit 19 for detecting the current value input to air volume calculation unit 24 (Step S306, Step S302). Predetermined air volume Qa is a previously stored air volume value. This Qa is set to a value sufficiently small relative to the rated air volume, and with which accurate winding current cannot be detected by current detecting unit 20 unless the amplification factor is switched.

With the ventilation device structured as described above, since shunt resistors 18 are inserted between the lower stage in respective phases of inverter circuit 15 and the negative potential side and current flowing through motor 8 is detected by detecting current flowing through shunt resistors 18, the winding current can be accurately detected. Further, by changing the amplification factor of one of the phases by amplification factor changing unit 22, the winding current can be accurately detected. Accordingly, ventilation from a small air volume to a large air volume exploiting the characteristic of the DC motor can be realized by a single body.

Further, in the present exemplary embodiment, though amplification factor changing unit 22 switches the amplification factor in accordance with target air volume Qs, it is also possible that amplification factor changing unit 22 switches the amplification factor based on the current value detected by current detecting unit 20.

Still further, in the present exemplary embodiment, motor 8 formed by a sensorless brushless DC motor is employed. However, amplification factor changing unit 22 switching the amplification factor can be also applied to a brushless DC motor that detects the relative position of rotor 17 to stator 16 using the output of a magnetic sensor. That is, the same effect can be achieved in the structure in which shunt resistor 18 is connected to one of the phases, and amplification factor changing unit 22 switches the amplification factor of amplifier unit 19 amplifying the potential difference across shunt resistor 18.

Fourth Exemplary Embodiment

In the following, a description will be given of a ventilation device according to a fourth exemplary embodiment of the present invention.

With the ventilation device according to the present exemplary embodiment, by exploiting the characteristic of a DC motor, control is exerted from low rotation speeds to high rotation speeds, and a single ventilation device caters from a small air volume to a large air volume.

Note that, since the overall structure of the ventilation device according to the present exemplary embodiment is similar to that of the ventilation device according to the first exemplary embodiment of the present invention, constituent elements are denoted by identical reference characters and a description thereof will be omitted.

Figure 8:
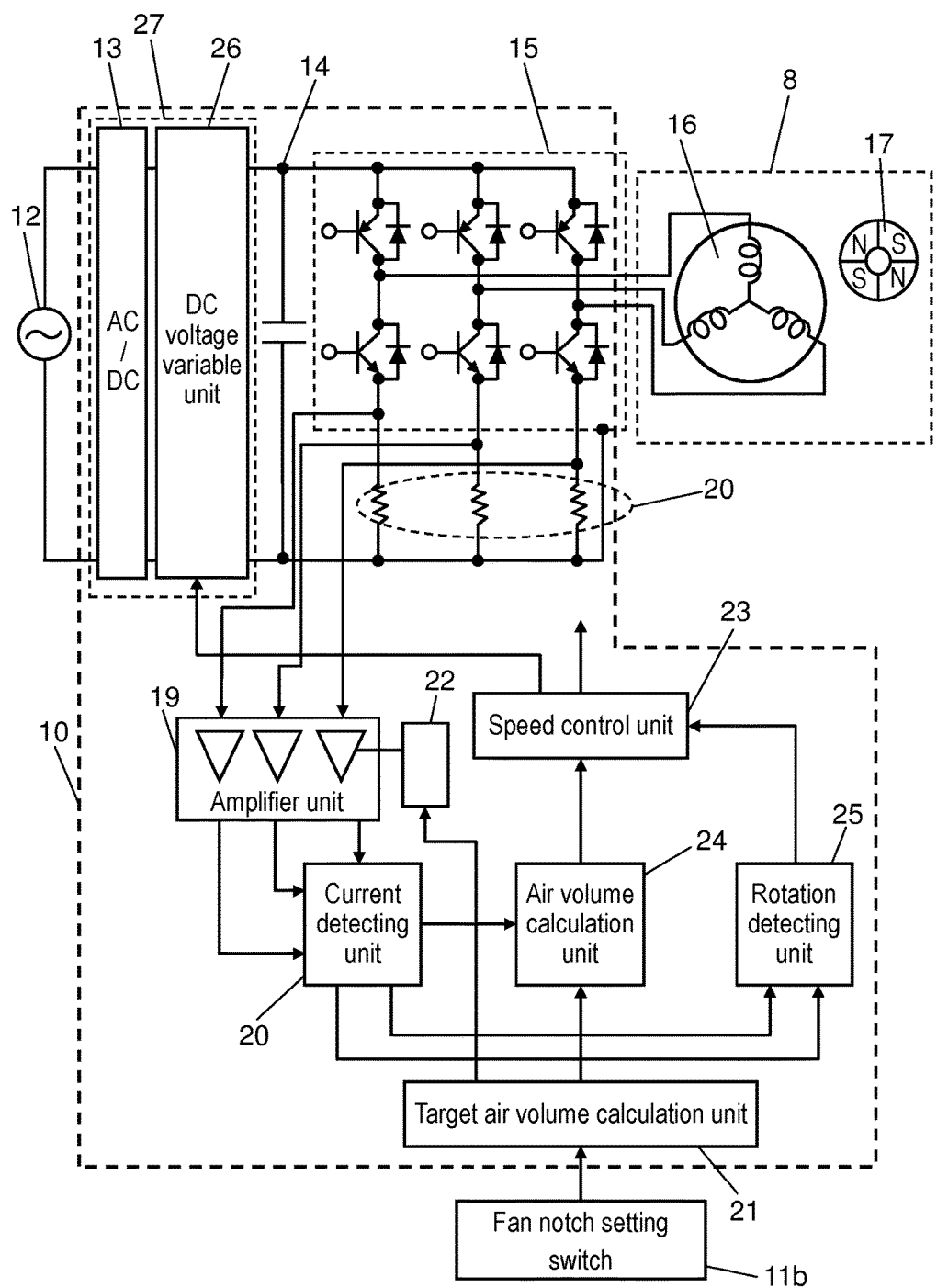
FIG. 8 is a block diagram showing the structure of a control circuit of a ventilation device according to a fourth exemplary embodiment according to the present invention.

FIG. 8 is a block diagram showing the structure of control circuit 10 of a ventilation device according to the fourth exemplary embodiment of the present invention. In FIG. 8, AC voltage supplied from commercial power supply 12 is converted into DC voltage by AC-DC converter circuit 13. Thereafter, DC voltage variable unit 26 generates desired DC voltage. The generated DC voltage is smoothed by smoothing capacitor 14, and the smoothed DC voltage is applied to inverter circuit 15. Inverter circuit 15 brings six switching elements into conduction in order, to thereby drive motor 8 formed of a sensorless brushless DC motor. Motor 8 is made up of stator 16 around which windings are wrapped and rotor 17 provided with a magnet.

Note that, AC-DC converter circuit 13 structures power supply circuit 27 with DC voltage variable unit 26.

Further, between the lower stage in respective phases of inverter circuit 15 and the negative potential side, shunt resistors 18 are inserted for respective phases. The potential differences across shunt resistors 18 that occur by current flowing through shunt resistors 18 are amplified by amplifier unit 19. From the output of amplifier unit 19, current detecting unit 20 detects current of each phase flowing through motor 8. Rotation detecting unit 25 calculates the rotation speed and position of motor 8 based on the current detected by current detecting unit 20.

Air volume calculation unit 24 compares the current value of one phase out of the current values of respective phases detected by current detecting unit 20 and the rotation speed detected by rotation detecting unit 25 with a current value and a rotation speed corresponding to target air volume Qs. Then, air volume calculation unit 24 determines whether the blown air volume is higher or lower than target air volume Qs based on the comparison result.

Target air volume calculation unit 21 calculates target air volume Qs in accordance with the setting of fan notch setting switch 11b, and instructs air volume calculation unit 24 about target air volume Qs.

Amplification factor changing unit 22 receives target air volume Qs calculated by target air volume calculation unit 21, and changes the amplification factor of amplifier unit 19 of a predetermined phase in accordance with the magnitude of target air volume Qs.

Based on the comparison result by air volume calculation unit 24, speed control unit 23 instructs DC voltage variable unit 26 to change the output voltage, and outputs, to inverter circuit 15, duty in accordance with the modulation rate of voltage applied to the motor. Thus, speed control unit 23 varies the rotation speed of motor 8.

DC voltage variable unit 26 receives target air volume Qs calculated by target air volume calculation unit 21, and determines the initial output voltage applied to inverter circuit 15, in accordance with target air volume Qs. Then, DC voltage variable unit 26 increases or reduces the output voltage following the instruction from speed control unit 23.

Then, motor 8 varies the rotation speed and output the necessary air volume.

Figure 9:
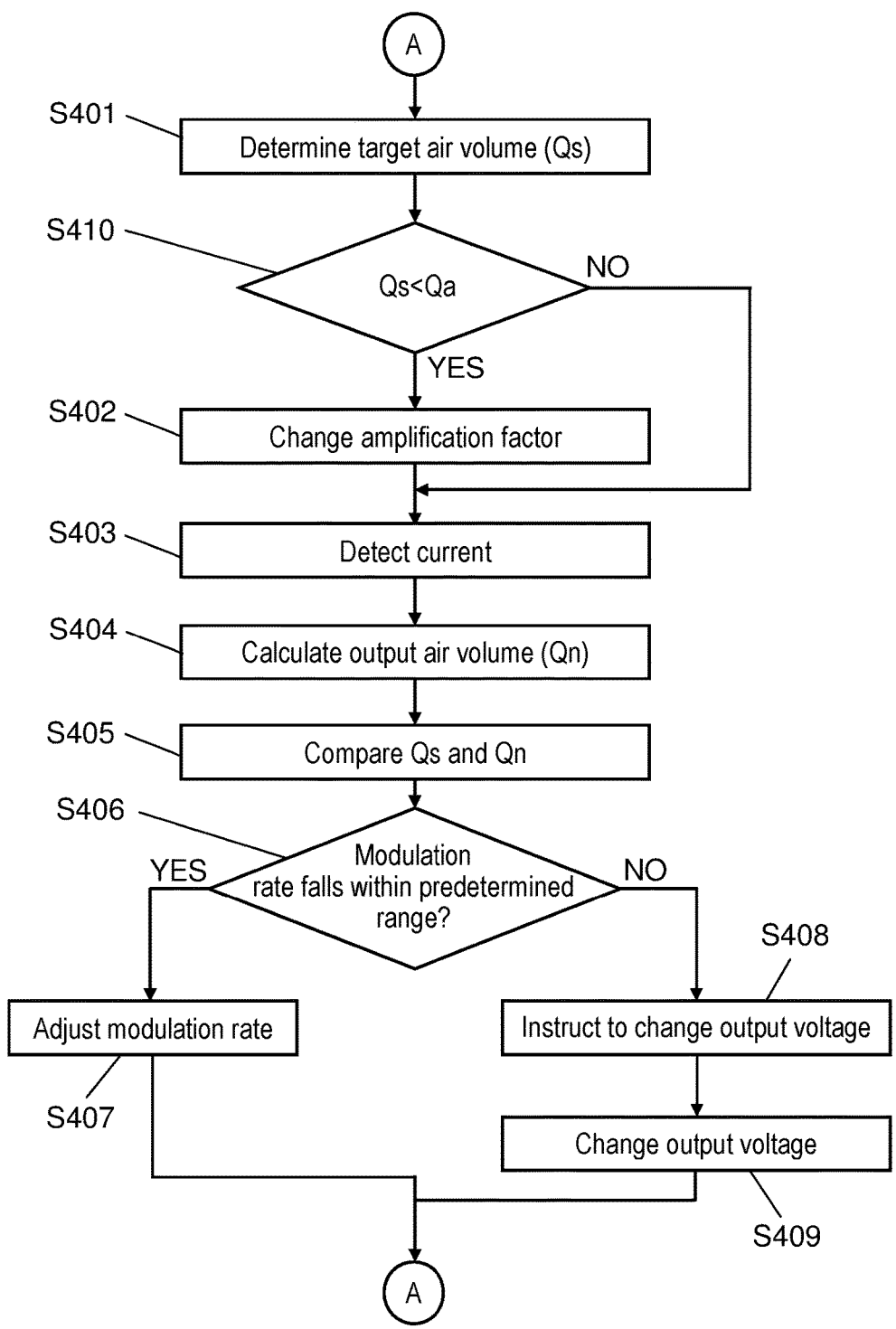
FIG. 9 is a flowchart showing the driving operation of the ventilation device according to the fourth exemplary embodiment of the present invention.

In the following, with reference to FIG. 9, a description will be given of the operation of the ventilation device according to the present exemplary embodiment.

The user manipulates remote controller apparatus 11 to turn ON body 3 of the ventilation device so as to drive the ventilation device. Further, the user sets fan notch setting switch 11b to, for example, weak notch. Then, voltage is applied to control circuit 10, and target air volume calculation unit 21 determines target air volume Qs according to the setting "weak notch" of fan notch setting switch 11b and instructs air volume calculation unit 24 about the determined target air volume Qs (Step S401). Target air volume Qs may be determined by referring to a table stored in memory, or may be based on a preset calculation formula. Air volume calculation unit 24 and amplification factor changing unit 22 are informed of target air volume Qs.

When target air volume Qs is determined, amplification factor changing unit 22 changes the amplification factor of one of the three phases in accordance with target air volume Qs (Step S402). Based on the comparison result by air volume calculation unit 24, speed control unit 23 instructs DC voltage variable unit 26 to change the output voltage, and outputs duty to inverter circuit 15. Further, target air volume Qs determined by target air volume calculation unit 21 is sent to DC voltage variable unit 26. DC voltage variable unit 26 determines the initial output voltage based on target air volume Qs, and outputs the determined initial output voltage to inverter circuit 15. The initial output voltage may be calculated not only when power is turned ON, but also when setting is changed by fan notch setting switch 11b.

When inverter circuit 15 receives the duty, inverter circuit 15 brings six switching elements into conduction in order, to thereby drive motor 8 formed of a sensorless brushless DC motor. When motor 8 is driven, current flows through shunt resistors 18. Amplifier unit 19 amplifies the potential differences across shunt resistors 18. Current detecting unit 20 detects the amplified potential differences across shunt resistors 18, and based on the potential differences, current detecting unit 20 detects, for each phase, winding current flowing through the windings of motor 8 (Step S403). Out of the detected winding current of respective phases, the current of two phases is input to rotation detecting unit 25. While a detailed description will be given later, the winding current of the remaining one phase is input to air volume calculation unit 24. Rotation detecting unit 25 calculates the rotation speed and position of motor 8 from the winding current of the two phases.

Next, air volume calculation unit 24 calculates present output air volume Qn, based on the current value of the one phase detected by current detecting unit 20 and the modulation rate of voltage applied to the motor (Step S404). Specifically, for example, the relationship between the modulation rate of voltage applied to motor 8 and the motor current with target air volume Qs is previously stored, and present output air volume Qn is reversely calculated based on this relationship. That is, for the modulation rate of the voltage applied to motor 8, the motor current when target air volume Qs is attained (defined motor current) is obtained. The obtained defined motor current value is compared with the current value of the one phase detected by current detecting unit 20. When the defined motor current value is smaller, it is determined that output air volume Qn is great (excessively great) relative to target air volume Qs. On the other hand, when the defined motor current value is greater, it is determined that output air volume Qn is small (insufficient) relative to target air volume Qs. Further, when the defined motor current value and the current value of the one phase detected by current detecting unit 20 are equal to each other, it is determined that output air volume Qn is equal to target air volume Qs (Step S405).

Then, speed control unit 23 instructs DC voltage variable unit 26 to change the output voltage or changes the modulation rate of inverter circuit 15, such that the modulation rate falls within a predetermined range. Here, in order to reduce the switching loss of inverter circuit 15 and increase the total efficiency of motor 8 and control circuit 10, the modulation rate is set to fall within the predetermined range which is 70% to 90%.

In more detail, when output air volume Qn is smaller than target air volume Qs, speed control unit 23 performs a process of increasing the modulation rate (Step S406, Step S407). On the other hand, when the modulation rate is increased to the upper limit value, speed control unit 23 instructs DC voltage variable unit 26 to increase the output voltage (Step S406, Step S408, Step S409).

Conversely, when output air volume Qn is greater than target air volume Qs, speed control unit 23 performs a process of reducing the modulation rate (Step S406, Step S407). However, when the modulation rate is reduced to the lower limit value, speed control unit 23 instructs DC voltage variable unit 26 to reduce the output voltage (Step S406, Step S408, Step S409).

Here, when output air volume Qn is sufficiently small relative to the rated air volume, the current flowing through shunt resistors 18 is small, and it is difficult for current detecting unit 20 to accurately detect the current flowing through the windings. Accordingly, when target air volume Qs is smaller than predetermined air volume Qa, amplification factor changing unit 22 performs a process of increasing the amplification factor of amplifier unit 19 for detecting the current value input to air volume calculation unit 24 (Step S410, Step S402). Predetermined air volume Qa is a previously stored air volume value. This Qa is set to a value sufficiently small relative to the rated air volume, and with which accurate winding current cannot be detected by current detecting unit 20 unless the amplification factor is switched.

With the ventilation device structured as described above, since shunt resistors 18 are inserted between the lower stage in respective phases of inverter circuit 15 and the negative potential side and current flowing through motor 8 is detected by detecting current flowing through shunt resistors 18, the winding current can be accurately detected. Further, by changing the amplification factor of one of the phases by amplification factor changing unit 22, the winding current can be accurately detected. Accordingly, ventilation from a small air volume to a large air volume exploiting the characteristic of the DC motor can be realized by a single body.

Further, in the present exemplary embodiment, though amplification factor changing unit 22 switches the amplification factor in accordance with target air volume Qs, it is also possible that amplification factor changing unit 22 switches the amplification factor based on the current value detected by current detecting unit 20.

Still further, in the present exemplary embodiment, motor 8 formed of a sensorless brushless DC motor is employed. However, amplification factor changing unit 22 switching the amplification factor can be also applied to a brushless DC motor that detects the relative position of rotor 17 to stator 16 using the output of a magnetic sensor. That is, the same effect can be achieved in the structure in which shunt resistor 18 is connected to one of the phases, and amplification factor changing unit 22 switches the amplification factor of amplifier unit 19 amplifying the potential difference across shunt resistor 18.

Still further, though input of target air volume calculation unit 21 is the notch set with remote controller apparatus 11, it is also possible that a switch is provided in the body, and the notch set by the switch is employed as input.

Fifth Exemplary Embodiment

In the following, a description will be given of a ventilation device according to a fifth exemplary embodiment of the present invention.

With the ventilation device according to the present exemplary embodiment, by exploiting the characteristic of a DC motor, control is exerted from low rotation speeds to high rotation speeds, and a single ventilation device caters from a small air volume to a large air volume.

Note that, since the overall structure of the ventilation device according to the present exemplary embodiment is similar to that of the ventilation device according to the first exemplary embodiment of the present invention, constituent elements are denoted by identical reference characters and a description thereof will be omitted.

Figure 10:
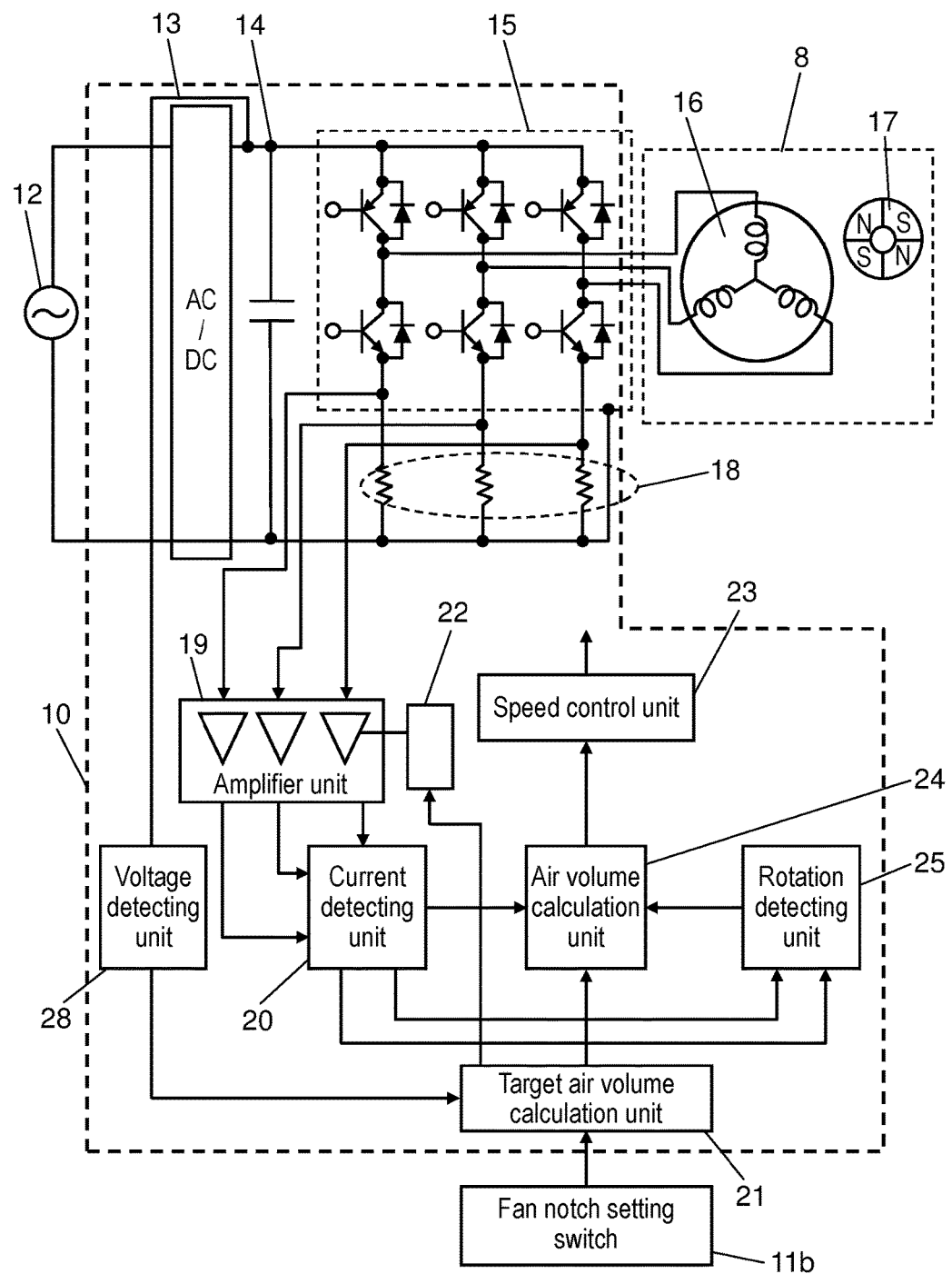
FIG. 10 is a block diagram showing the structure of a control circuit of a ventilation device according to a fifth exemplary embodiment of the present invention.

FIG. 10 is a block diagram showing the structure of control circuit 10 of the ventilation device according to the fifth exemplary embodiment of the present invention. In FIG. 5, AC voltage supplied from commercial power supply 12 is converted into DC voltage by AC-DC converter circuit 13. Thereafter, the DC voltage is smoothed by smoothing capacitor 14, and the smoothed DC voltage is applied to inverter circuit 15. Inverter circuit 15 brings six switching elements into conduction in order, to thereby drive motor 8 formed of a sensorless brushless DC motor. Motor 8 is made up of stator 16 around which windings are wrapped and rotor 17 provided with a magnet.

Further, between the lower stage in respective phases of inverter circuit 15 and the negative potential side, shunt resistors 18 are inserted for respective phases. The potential differences across shunt resistors 18 that occur by current flowing through shunt resistors 18 are amplified by amplifier unit 19. From the output of amplifier unit 19, current detecting unit 20 detects current of each phase flowing through motor 8. Rotation detecting unit 25 calculates the rotation speed and position of motor 8 based on the current detected by current detecting unit 20.

Air volume calculation unit 24 compares the current value of one phase out of the current values of respective phases detected by current detecting unit 20 and the rotation speed calculated by rotation detecting unit 25 with a current value and rotation speed corresponding to target air volume Qs. Then, air volume calculation unit 24 determines whether the blown air volume is higher or lower than target air volume Qs based on the comparison result.

Target air volume calculation unit 21 calculates target air volume Qs in accordance with the setting of fan notch setting switch lib, and instructs air volume calculation unit 24 about target air volume Qs.

Amplification factor changing unit 22 receives target air volume Qs calculated by target air volume calculation unit 21, and changes the amplification factor of amplifier unit 19 of a predetermined phase in accordance with the magnitude of target air volume Qs.

Speed control unit 23 outputs duty to inverter circuit 15, and varies the rotation speed of motor 8 formed by a sensorless brushless DC motor.

Then, motor 8 outputs the necessary air volume by varying the rotation speed.

Further, control circuit 10 includes voltage detecting unit 28 that detects voltage of smoothing capacitor 14 being the driving voltage of motor 8. Voltage detecting unit 28 outputs the detected voltage value to target air volume calculation unit 21. Target air volume calculation unit 21 monitors the voltage value detected by voltage detecting unit 28, and when the voltage value drops by at least a predetermined deviation, target air volume calculation unit 21 reduces target air volume Qs.

Figure 11:
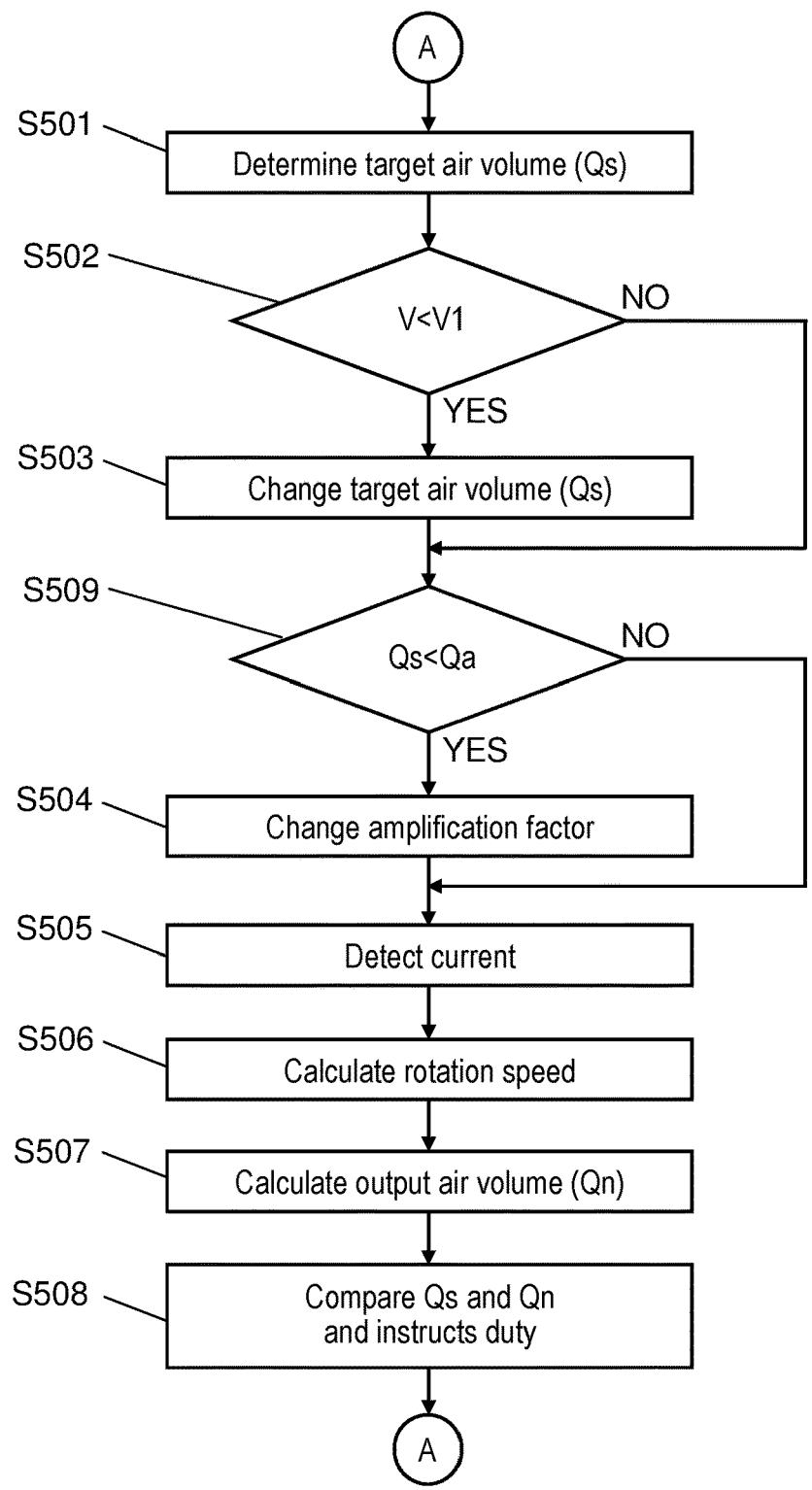
FIG. 11 is a flowchart showing the driving operation of the ventilation device according to the fifth exemplary embodiment of the present invention.

In the following, with reference to FIG. 11, a description will be given of the operation of the ventilation device according to the present exemplary embodiment.

The user manipulates remote controller apparatus 11 to turn ON body 3 of the ventilation device so as to drive the ventilation device. Further, the user sets fan notch setting switch 11*b* to, for example, weak notch. Then, voltage is applied to control circuit 10, and target air volume calculation unit 21 determines target air volume Qs corresponding to the weak notch according to the setting "weak notch" of fan notch setting switch 11*b*, and instructs air volume calculation unit 24 about the determined target air volume Qs (Step S501). Target air volume Qs may be determined by referring to a table stored in memory, or may be based on a preset calculation formula.

Further, when signal V from voltage detecting unit 28 becomes lower than predetermined threshold value V1, target air volume calculation unit 21 determines that voltage of smoothing capacitor 14 has dropped by an instantaneous power failure (Step S502). Then, target air volume calculation unit 21 reduces target air volume Qs to, for example, minimum air volume Qmin irrespective of the setting of fan notch setting switch 11*b* (Step S503). Thus, when an instantaneous power failure occurs, target air volume Qs reduces to minimum air volume Qmin. Thus, the voltage drop of smoothing capacitor 14 becomes mild, and control of motor 8 can be continued until the instantaneous power failure is recovered.

Note that, when signal V from voltage detecting unit 28 recovers to be equal to or greater than predetermined threshold value V1, target air volume calculation unit 21 performs an operation of returning to target air volume Qs based on the setting of fan notch setting switch 11*b* (Step S502).

When target air volume Qs is determined, amplification factor changing unit 22 changes the amplification factor of one of the three phases, in accordance with target air volume Qs (Step S504). Speed control unit 23 outputs duty to inverter circuit 15 based on the value determined by target air volume Qs.

When inverter circuit 15 receives the duty, inverter circuit 15 brings six switching elements into conduction in order, to thereby drive motor 8 formed of a sensorless brushless DC motor. When motor 8 is driven, current flows through shunt resistors 18. Amplifier unit 19 amplifies the potential differences across shunt resistors 18. Current detecting unit 20 detects the amplified potential differences across shunt resistors 18, and based on the potential differences, current detecting unit 20 detects, for each phase, winding current flowing through the windings of motor 8 (Step S505). Out of the detected winding current of respective phases, the current of two phases is input to rotation detecting unit 25. While a detailed description will be given later, the winding current of the remaining one phase is input to air volume calculation unit 24. Rotation detecting unit 25 calculates the rotation speed and position of motor 8 from the winding current of the two phases.

Next, air volume calculation unit 24 calculates present output air volume Qn, based on the current value of the one phase detected by current detecting unit 20 and the rotation speed detected by rotation detecting unit 25 (Step S505, Step S506, Step S507). Then, air volume calculation unit 24 compares the calculated output air volume Qn with target air volume Qs. When output air volume Qn is smaller than target air volume Qs, air volume calculation unit 24 instructs speed control unit 23 to output great duty. When output air volume Qn is greater than target air volume Qs, air volume calculation unit 24 instructs speed control unit 23 to output small duty. Thus, control is exerted such that deviation of output air volume Qn from target air volume Qs becomes small (Step S508).

Here, when output air volume Qn is sufficiently small relative to the rated air volume, the current flowing through shunt resistors 18 is small, and it is difficult for current detecting unit 20 to accurately detect the current flowing through the windings. Accordingly, when target air volume Qs is smaller than predetermined air volume Qa, amplification factor changing unit 22 performs a process of increasing the amplification factor of amplifier unit 19 for detecting the current value input to air volume calculation unit 24 (Step S509, Step S504). Predetermined air volume Qa is a previously stored air volume value. This Qa is set to a value sufficiently small relative to the rated air volume, and with which accurate winding current cannot be detected by current detecting unit 20 unless the amplification factor is switched.

With the ventilation device structured as described above, since shunt resistors 18 are inserted between the lower stage in respective phases of inverter circuit 15 and the negative potential side and current flowing through motor 8 is detected by detecting current flowing through shunt resistors 18, the winding current can be accurately detected. Further, by changing the amplification factor of one of the phases by amplification factor changing unit 22, the winding current can be accurately detected. Accordingly, ventilation from a small air volume to a large air volume exploiting the characteristic of the DC motor can be realized by a single body.

Further, target air volume calculation unit 21 stores therein lower limit value (threshold value) V1 of power supply voltage. Target air volume calculation unit 21 determines that an instantaneous power failure has occurred when signal V from voltage detecting unit 28 becomes smaller than threshold value V1. When target air volume calculation unit 21 determines that an instantaneous power failure has occurred, target air volume calculation unit 21 instructs to reduce target air volume Qs. Then, by a reduction in target air volume Qs, the voltage drop of smoothing capacitor 14 becomes mild, and control of motor 8 can be continued until the instantaneous power failure recovers. That is, it is not necessary to stop motor 8, and a ventilation device that does not make the user feel uncomfortable can be structured.

Still further, in the present exemplary embodiment, though amplification factor changing unit 22 switches the amplification factor in accordance with target air volume Qs, it is also possible that amplification factor changing unit 22 switches the amplification factor based on the current value detected by current detecting unit 20.

Still further, in the present exemplary embodiment, motor 8 formed of a sensorless brushless DC motor is employed. However, amplification factor changing unit 22 switching the amplification factor can be also applied to a brushless DC motor that detects the relative position of rotor 17 to stator 16 using the output of a magnetic sensor. That is, the same effect can be achieved in the structure in which shunt resistor 18 is connected to one of the phases, and amplification factor changing unit 22 switches the amplification factor of amplifier unit 19 amplifying the potential difference across shunt resistor 18.

Still further, in the present exemplary embodiment, for output V from the voltage detecting unit, the predetermined threshold value is only V1. However, it is also possible to change the air volume stepwise by providing a plurality of predetermined threshold values.

INDUSTRIAL APPLICABILITY

The ventilation device of the present invention that is installed in a building is widely useful for products with which an air volume is obtained within a predetermined time period, irrespective of the duct resistance and the outside wind pressure.

REFERENCE MARKS IN THE DRAWINGS 1 room
2 attic
3 body
4 adaptor
5 exhaust duct
7 vane
8 motor
9 louver
10 control circuit
10a signal line
11 remote controller apparatus
11a power ON/OFF switch
11b fan notch setting switch
12 commercial power supply
13 AC-DC converter circuit
14 smoothing capacitor
15 inverter circuit
16 stator
17 rotor
18 shunt resistor
19 amplifier unit
20 current detecting unit
21 target air volume calculation unit
22 amplification factor changing unit
23 speed control unit
24 air volume calculation unit
25 rotation detecting unit
26 DC voltage variable unit
27 power supply circuit
28 voltage detecting unit

The invention claimed is:
1. A ventilation device capable of varying an air volume comprising:
   a motor driving a vane; and
   a control circuit controlling the motor,
   wherein
   the control circuit includes:
      an inverter circuit obtained by connecting, in a three-phase bridge manner, three arms formed by coupling, in series with DC voltage, two switching elements of an upper stage and a lower stage performing mutually opposite ON/OFF operations, to apply AC voltage of a three-phase PWM scheme to the motor;
      shunt resistors inserted for respective phases between the lower stage in respective phases of the inverter circuit and a negative potential side;

an amplifier unit configured to amplify voltage between terminals of the shunt resistors;

a current detecting unit configured to detect current of respective phases flowing through the motor from an output of the amplifier unit;

a rotation detecting unit configured to calculate a rotation speed and a position of the motor based on the current detected by the current detecting unit;

an air volume calculation unit configured to receive a current value of one phase out of current values of respective phases detected by the current detecting unit and the rotation speed calculated by the rotation detecting unit, and configured to compare the received current value and the received rotation speed with a current value and a rotation speed corresponding to a target air volume; and a speed control unit configured to control the rotation speed of the motor by varying duty for the inverter circuit, based on a comparison result of the air volume calculation unit.

2. The ventilation device according to claim 1, further comprising a power supply circuit including a DC voltage variable unit configured to generate desired DC voltage for the inverter circuit after rectifying and smoothing commercial power supply, wherein the DC voltage variable unit varies output DC voltage in accordance with the target air volume.

3. The ventilation device according to claim 1, further comprising:

a target air volume calculation unit configured to calculate a target value of an air volume output from the ventilation device; and a voltage detecting unit configured to detect driving voltage of the motor, wherein the target air volume calculation unit monitors a voltage value detected by the voltage detecting unit, and issues an instruction to reduce the target air volume when the voltage value drops by at least a predetermined deviation.

4. The ventilation device according to claim 1, wherein the control circuit includes an amplification factor changing unit configured to change an amplification factor of the amplifier unit, and the amplification factor changing unit switches the amplification factor of the amplifier unit for detecting a current value input to the air volume calculation unit based on the target air volume.

5. The ventilation device according to claim 1, wherein the control circuit includes an amplification factor changing unit configured to change an amplification factor of the amplifier unit, and the amplification factor changing unit switches the amplification factor of the amplifier unit for detecting a current value input to the air volume calculation unit based on current detected by the current detecting unit.

6. A ventilation device capable of varying an air volume comprising:

a motor driving a vane; and a control circuit controlling the motor, wherein the control circuit includes:

an inverter circuit obtained by connecting, in a three-phase bridge manner, three arms formed by coupling, in series with DC voltage, two switching elements of an upper stage and a lower stage performing mutually opposite ON/OFF operations, to apply voltage of a three-phase PWM scheme to the motor;

shunt resistors inserted for respective phases between the lower stage in respective phases of the inverter circuit and a negative potential side;

an amplifier unit configured to amplify voltage between terminals of the shunt resistors;

a current detecting unit configured to detect current of each phase flowing through the motor from an output of the amplifier unit;

a rotation detecting unit configured to calculate a rotation speed and a position of the motor based on the current detected by the current detecting unit;

a speed control unit configured to control the rotation speed of the motor by varying duty for the inverter circuit; and an air volume calculation unit configured to receive a current value of one phase out of current values of respective phases detected by the current detecting unit and a modulation rate of voltage applied to the motor, and configured to compare the received current value and the received modulation rate with a current value and a modulation rate corresponding to a target air volume, and the speed control unit increases or reduces the modulation rate to achieve the target air volume based on a comparison result of the air volume calculation unit and outputs the modulation rate to the inverter circuit.

7. The ventilation device according to claim 6, further comprising a power supply circuit including a DC voltage variable unit configured to generate desired DC voltage for the inverter circuit after rectifying and smoothing commercial power supply, wherein the speed control unit instructs the DC voltage variable unit to change output voltage based on a comparison result of the air volume calculation unit, and the DC voltage variable unit determines initial output voltage applied to the motor in accordance with the target air volume, and increases or reduces the output voltage following the instruction of the speed control unit.

* * * * *